US 9,145,050 B2

(12) United States Patent
Kawasaki et al.

(10) Patent No.: US 9,145,050 B2
(45) Date of Patent: Sep. 29, 2015

(54) ELECTRIC VEHICLE

(71) Applicant: HONDA MOTOR CO., LTD., Tokyo (JP)

(72) Inventors: Yohei Kawasaki, Wako (JP); Masaru Odajima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 13/848,175

(22) Filed: Mar. 21, 2013

(65) Prior Publication Data

US 2013/0284526 A1    Oct. 31, 2013

(30) Foreign Application Priority Data

Mar. 30, 2012  (JP) ................. 2012-080980

(51) Int. Cl.
| | |
|---|---|
| *B60K 7/00* | (2006.01) |
| *B60G 3/20* | (2006.01) |
| *B60G 9/00* | (2006.01) |
| *B60G 7/00* | (2006.01) |
| *B60K 17/04* | (2006.01) |

(52) U.S. Cl.
CPC ............... *B60K 7/0007* (2013.01); *B60G 3/20* (2013.01); *B60G 7/00* (2013.01); *B60G 9/00* (2013.01); *B60G 2204/129* (2013.01); *B60G 2204/182* (2013.01); *B60K 7/00* (2013.01); *B60K 17/043* (2013.01); *B60K 2007/0038* (2013.01); *B60K 2007/0061* (2013.01)

(58) Field of Classification Search
None
See application file for complete search history.

(56) References Cited

U.S. PATENT DOCUMENTS

| | | | |
|---|---|---|---|
| 5,087,229 A * | 2/1992 | Hewko et al. ................. | 475/149 |
| 5,156,579 A * | 10/1992 | Wakuta et al. ................ | 475/161 |
| 5,163,528 A * | 11/1992 | Kawamoto et al. ........ | 180/65.51 |
| 6,722,459 B1 * | 4/2004 | Wendl et al. ................ | 180/65.51 |
| 7,118,119 B2 * | 10/2006 | Amanuma ............ | 280/124.135 |
| 7,243,749 B2 * | 7/2007 | Kakinami et al. ......... | 180/65.51 |
| 7,320,376 B2 * | 1/2008 | Kurata ........................ | 180/65.51 |
| 7,347,295 B2 * | 3/2008 | Kurata ........................ | 180/65.51 |
| 7,422,080 B2 * | 9/2008 | Suzuki et al. .............. | 180/65.51 |
| 7,703,780 B2 * | 4/2010 | Mizutani et al. ........... | 280/124.1 |
| 7,958,959 B2 * | 6/2011 | Yogo et al. ................ | 180/65.51 |
| 2006/0048978 A1* | 3/2006 | Nagaya ........................ | 180/6.48 |
| 2007/0068715 A1* | 3/2007 | Mizutani et al. ............. | 180/65.5 |

FOREIGN PATENT DOCUMENTS

JP     2005-126037 A     5/2005

* cited by examiner

*Primary Examiner* — J. Allen Shriver, II
*Assistant Examiner* — Hilary L Johns
(74) *Attorney, Agent, or Firm* — Squire Patton Boggs (US) LLP

(57) ABSTRACT

A drive unit and a rear cushion overlap each other in a vehicle front view. Since the rear cushion is disposed to overlap the drive unit, the dimension in a vehicle width direction can be made smaller than that in the case where the cushion is disposed on the vehicle width center side of the drive unit.

14 Claims, 6 Drawing Sheets

ELECTRIC VEHICLE

BACKGROUND

Field

The present invention relates to improvements of an electric vehicle in which left and right drive wheels are driven respectively by electric drive units.

Electric vehicles which can easily achieve energy saving and reduction in environmental load are attracting attention and are being put to practical use. As a result of improvements in performances of electric motors, there has been proposed a drive method in which one electric motor drives one drive wheel (see, for example, FIG. 1 of Patent Document 1 (Japanese Patent Publication No. 2005-126037).

Note that an electric motor, a hydraulic motor, and a pneumatic motor are collectively referred to as motors. When there is a need to specify the type of the motor, a term of electric motor is used.

As shown in FIG. 1 of Patent Document 1, a knuckle (180) (the number in parentheses indicates reference numeral described in Patent Document 1. The same shall apply hereinafter) is disposed on a vehicle width center side of an electrically-driven wheel (100), a motor (70) is disposed on a vehicle width center side of the knuckle (180), and a shock absorber (230) is disposed on a vehicle width center side of the motor (70).

Recently, there is a demand for increase in drive power, and therefore the motor (70) tends to be increased in size. When the size of the motor (70) is increased, a portion of the motor (70) protruding from a recessed portion of the electrically-driven wheel (100) toward the vehicle width center becomes larger relative to a portion of the motor (70) housed in the recessed portion. Moreover, a structure in which the motor (70) and a reducer are integrated with each other is proposed.

When the structure of Patent Document 1 is applied to a small vehicle such as a compact car whose vehicle width is limited, designing of a vehicle becomes difficult because the motor (70) largely protrudes toward the vehicle width center.

In other words, it is desirable to reduce the size of a drive system including the motor in order to improve freedom in vehicle design.

Moreover, it is desirable that a vehicle width dimension from the electrically-driven wheel (100) to the shock absorber (230) is small also in a general passenger vehicle. This is because a space is secured between the left and right shock absorbers (230) and a vehicle body frame and various instruments can be disposed in this space.

In other words, there is a demand for a structure in which a dimension in the vehicle width direction can be suppressed even when a motor including a reducer is increased in size and largely protrudes from a recessed portion of a drive wheel.

SUMMARY

An object of the present invention is to provide a structure in which a dimension in a vehicle width direction can be suppressed even when an electric motor including a reducer largely protrudes from a recessed portion of a drive wheel.

A first embodiment of the invention is an electric vehicle which includes left and right drive wheels and in which a brake device is provided in a recessed portion of a wheel of each of the drive wheels and the wheel of each of the drive wheels is driven by a drive unit. A vertically-swingable upper arm and a vertically-swingable lower arm extend from a vehicle body frame of the electric vehicle in a vehicle width direction. A knuckle is connected to a distal end of the upper arm and a distal end of the lower arm, the wheel is rotatably supported by the knuckle, the drive unit is connected to the knuckle from a vehicle body center side, and a cushion is laid between the vehicle body frame and the lower arm. In this example, the drive unit can be a unit in which an electric motor and a reducer are integrated. An upper arm portion extends obliquely upward toward a rear of the vehicle from the knuckle interposed between the wheel and the drive unit to a position where the upper arm portion does not overlap the drive unit in a vehicle side view. The upper arm is connected to an upper end of the upper arm portion, and the cushion is disposed on a vehicle rear side of the upper arm, and the cushion is thereby disposed to overlap the drive unit in a vehicle front view.

A second embodiment of the invention is such that a line is extended upward from a rotation center of the wheel in the vehicle side view, and the electric motor is disposed in such a way that a motor shaft of the electric motor overlaps the line.

A third embodiment of the invention is one where the drive unit is formed by attaching the electric motor to one surface of a center case and by attaching the reducer to another surface of the center case. In the vehicle side view, an upper half of a motor case has a semicircle shape and at least part of a joint portion is disposed in an almost-triangular space surrounded by the semicircle, a horizontal line passing through the uppermost point of the semicircle, and a vertical line passing through the vehicle rearmost point of the semicircle.

A fourth embodiment of the invention is such that, in the vehicle front view, the reducer is disposed on a side closer to the wheel, and the electric motor is disposed on a vehicle width center side. The motor shaft is rotatably supported at one end by the motor case, and is rotatably supported at another end by a reducer case, and a bearing supporting portion supporting the other end of the motor shaft is provided in the reducer case and protrudes to the recessed portion of the wheel while extending at a lateral side of the knuckle.

A fifth embodiment of the invention is such that the drive unit is disposed inside an outer diameter circle of a tire of each of the drive wheels in the vehicle side view.

A sixth embodiment of the invention is such that the upper arm portion, a lower joint portion connecting the lower arm to the knuckle, and a cushion connection portion connecting the cushion to the lower arm are disposed inside an outer diameter circle of a tire in the vehicle side view.

A seventh embodiment of the invention is such that the upper arm is a V-shaped member having an intermediate portion protruding upward and a vehicle body frame side connection portion of the upper arm is below the joint portion.

According to the first embodiment of the invention, the upper arm portion extends obliquely upward toward the rear of the vehicle from the knuckle to the position where the upper arm portion does not overlap the drive unit in the vehicle side view, the upper arm is connected to the upper end of the upper arm portion, and the cushion is disposed on the vehicle rear side of the upper arm. The cushion is thereby disposed to overlap the drive unit in the vehicle front view.

In this embodiment, since the cushion is disposed to overlap the drive unit in the vehicle front view, a dimension in the vehicle width direction can be made smaller than that in the case where the cushion is disposed on the vehicle width center side of the drive unit.

In other words, embodiments of the invention can provide a structure in which a dimension in the vehicle width direction can be suppressed even when the electric motor including the reducer largely protrudes from the recessed portion of the drive wheel.

According to the second embodiment of the invention, the line is extended upward from the rotation center of the wheel in the vehicle side view and the electric motor is disposed in such a way that the motor shaft of the electric motor overlaps the line.

Extending the electric motor upward allows the electric motor to be increased in size while avoiding interference with the cushion.

According to the third embodiment of the invention, the drive unit is formed by attaching the electric motor to the one surface of the center case and by attaching the reducer to the other surface of the center case. Moreover, in the vehicle side view, the upper half of the motor case has a semicircle shape and at least part of the joint portion is disposed in the almost-triangular space surrounded by the semicircle, the horizontal line passing through the uppermost point of the semicircle, and the vertical line passing through the vehicle rearmost point of the semicircle.

Disposing the joint portion in the almost-triangular space formed in a corner above the semicircle shape allows the joint portion to be disposed close to the motor case while avoiding interference with the motor case.

According to the fourth embodiment of the invention, the bearing supporting portion supporting the other end of the motor shaft is provided in the reducer case and protrudes to the recessed portion of the wheel while extending at the lateral side of the knuckle.

The reducer case which is part of the drive unit is thus partially housed in the recessed portion of the wheel. Accordingly, the drive unit can be disposed closer to the drive wheel by an amount corresponding to the housed portion. Particularly, the width of the vehicle body frame in the vehicle width direction can be secured even in a vehicle having a small width.

In other words, according to embodiments of the present invention, it is possible to dispose part of the drive unit in the wheel and thereby suppress the protruding of the drive unit to a small degree.

According to the fifth embodiment of the invention, the drive unit is disposed inside the outer diameter circle of the tire of each of the drive wheels in the vehicle side view.

Since the drive unit cannot be seen in the vehicle side view, appearance is improved. Moreover, since the tire serves as a protection material of the drive unit, a protection cover of the drive unit can be omitted.

According to the sixth embodiment of the invention, the upper arm portion, the lower joint portion connecting the lower arm to the knuckle, and the cushion connection portion connecting the cushion to the lower arm are disposed inside the outer diameter circle of the tire in the vehicle side view.

The upper arm portion, the lower joint portions, and the cushion connection portion are thus protected by the tire.

According to the seventh embodiment of the invention, the upper arm is the V-shaped member having the intermediate portion protruding upward and the vehicle body frame side connection portion of the upper arm is below the joint portion.

Forming the upper arm in a so-called "inverted-V shape" allows the upper arm to avoid the motor case.

DETAILED DESCRIPTION

Figure 1:
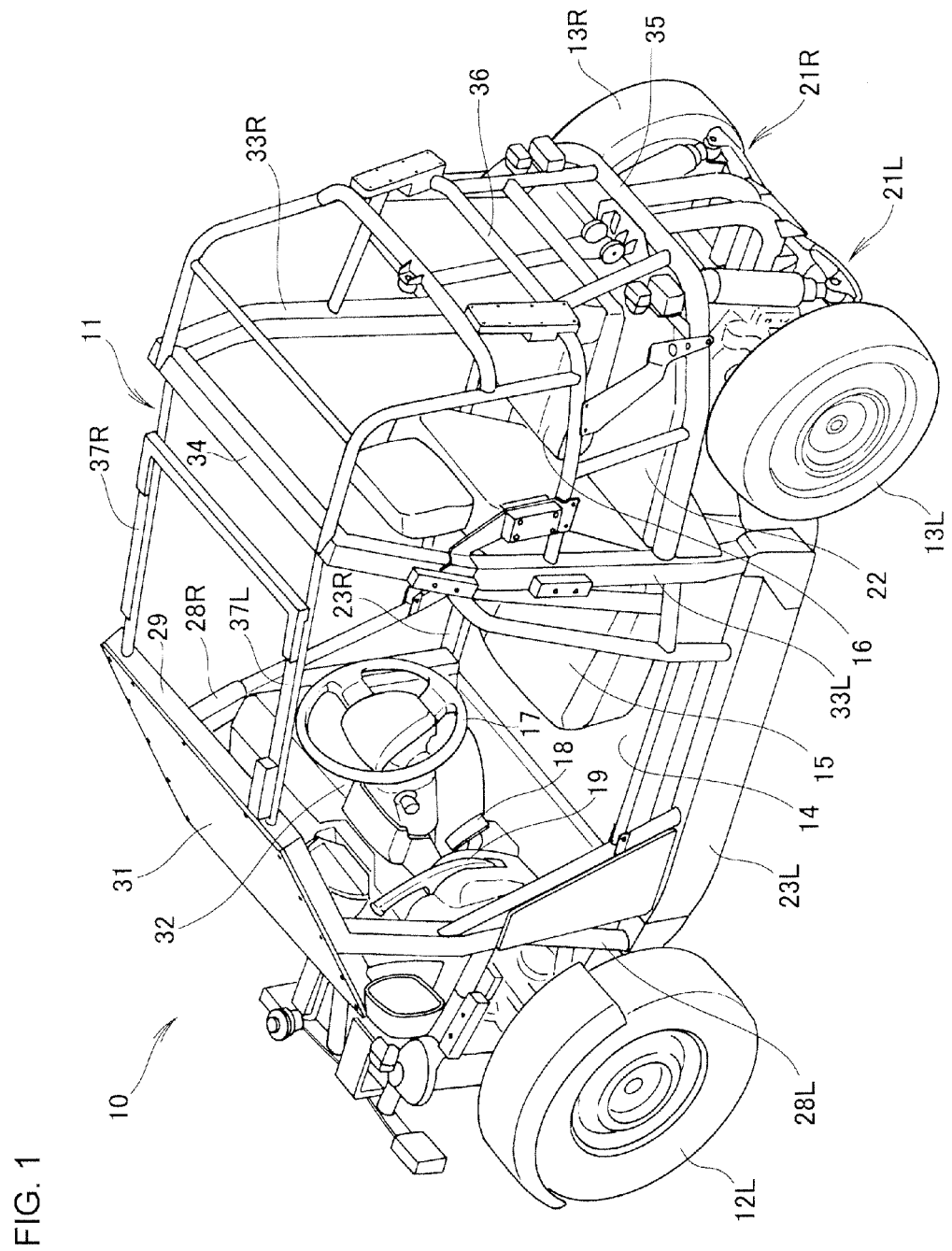
FIG. 1 is a perspective view of an electric vehicle according to an embodiment of the present invention.

Embodiments of the present invention are described below based on the accompanying drawings. Note that the drawings are to be viewed in a direction in which the reference numerals can be read properly. Moreover, front, rear, left, and right are based on a driver.

As shown in FIG. 1, an electric vehicle 10 is a narrow vehicle as follows. A vehicle body frame 11 is provided with a front wheel 12L (L is a suffix indicating left. The same hereafter) and rear wheels 13L, 13R (R is a suffix indicating right. The same hereafter). A driver seat 15 is provided on a floor 14. A passenger seat 16 is provided behind the driver seat 15. A steering wheel 17, a brake pedal 18, and a parking brake lever 19 are provided in front of the driver seat 15. Although not illustrated in FIG. 1, a right front wheel exists. In other words, the electric vehicle 10 is a narrow four-wheel vehicle.

The passenger seat 16 is disposed between the left and right rear wheels 13L, 13R and between suspension devices 21L, 21R. In some embodiments, the passenger seat 16 may be replaced with a rear cargo bed. Alternatively, the passenger seat 16 may be detachably attached onto a rear cargo bed 22.

The vehicle body frame 11 has left and right side sills 23L, 23R as well as a front cross frame 24, a front portion subframe 25 extending toward the front of the vehicle from the front cross frame 24, a rear cross frame 26, and a rear portion subframe 27 extending toward the rear of the vehicle from the rear cross frame 26 which are shown in FIG. 10.

Furthermore, as shown in FIG. 1, front upper frames 28L, 28R extend upward respectively from front end portions of the side sills 23L, 23R and a cross sub-member 29 is laid between upper ends of the front upper frames 28L, 28R. A front shield 31 is attached to the front upper frames 28L, 28R and the cross sub-member 29 from the front.

An instrument panel 32 is laid between the left and right front upper frames 28L, 28R. The steering wheel 17 is disposed slightly to the left of the vehicle width center of the instrument panel 32 and the parking brake lever 19 is disposed to the left of the steering wheel 17.

Moreover, rear upper frames 33L, 33R extend upward respectively from rear end portions of the side sills 23L, 23R and a cross sub-member 34 is laid between upper ends of the rear upper frames 33L, 33R. Furthermore, a square-U shaped rear subframe 35 extends from the rear upper frames 33L, 33R at a position above the rear wheels 13L, 13R to surround the passenger seat 16 from left, right, and rear. A cage-shaped cage frame 36 extends from the rear upper frames 33L, 33R and the cross sub-member 34 to surround the passenger seat 16 at a position above the rear subframe 35. Longitudinal members 37L, 37R are laid between the front cross sub-member 29 and the rear cross sub-member 34 and a vehicle cabin is thus formed.

Figure 2:
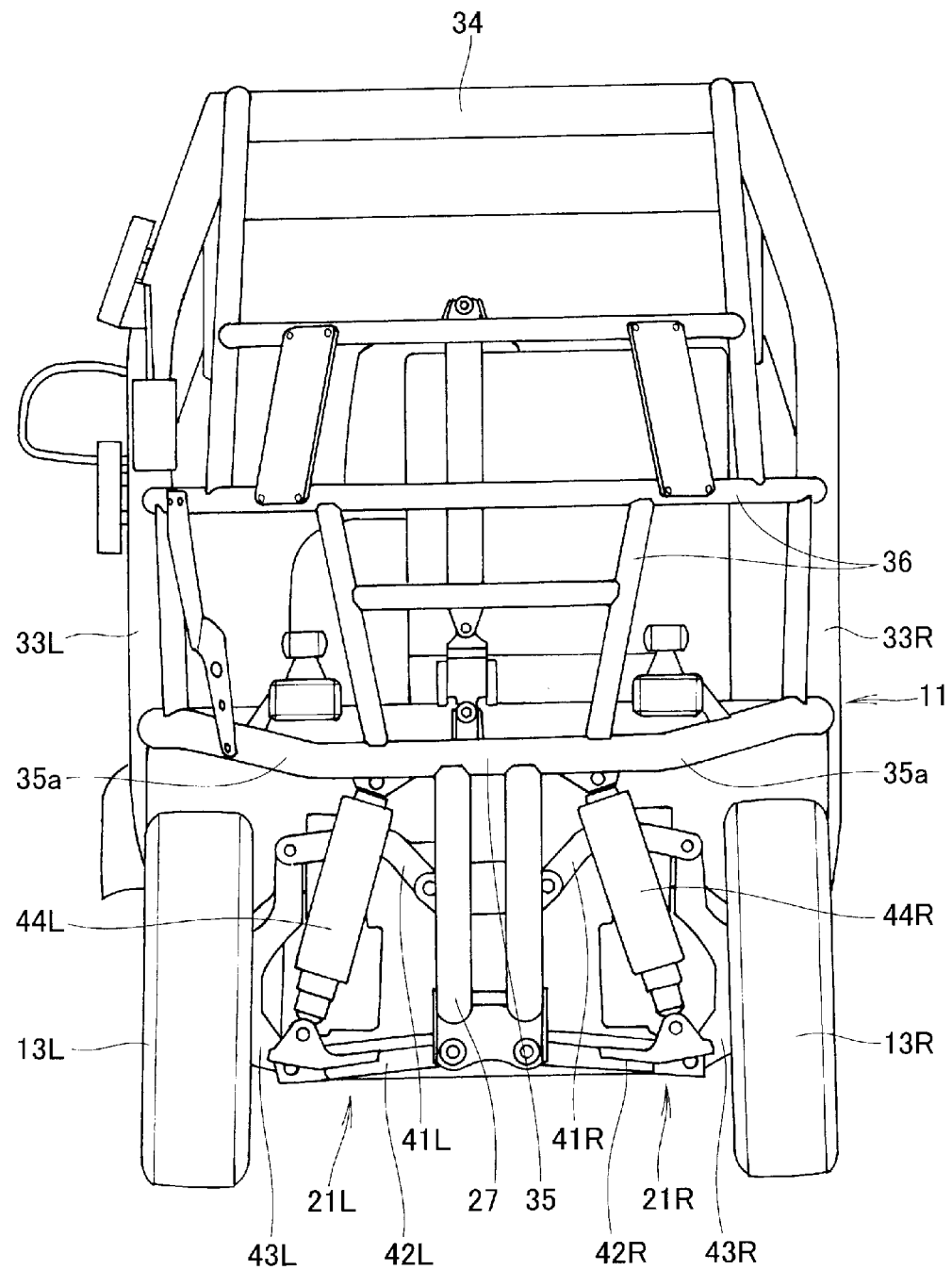
FIG. 2 is a rear view of the electric vehicle according to an embodiment of the present invention.

As shown in FIG. 2, the rear wheels 13L, 13R which are left and right drive wheels are supported by the suspension devices 21L, 21R to be vertically swingable on the vehicle body frame 11. Rear wheels 13L, 13R are each inclined in such a way that an upper end thereof is closer to the vehicle width center than a lower end thereof is.

The rear subframe 35 extending in a vehicle width direction is bent upward in portions over the rear wheels 13L, 13R. Providing bent portions 35a, 35b can secure spaces for upward swing of the rear wheels 13L, 13R.

The left suspension device 21L includes an upper arm 41L and a lower arm 42L which extend to the left from the vehicle body frame 11 in the vehicle width direction, a knuckle 43L which is connected to distal ends of the arms 41L, 42L, and a rear cushion 44L which is laid between the end of the lower arm 42L and the vehicle body frame 11 and buffers vertical movements of the rear wheels 13L, 13R.

In the right suspension device 21R, the suffixes of the reference numerals are changed from L to R and detailed description of the right suspension device 21R is omitted.

Figure 3:
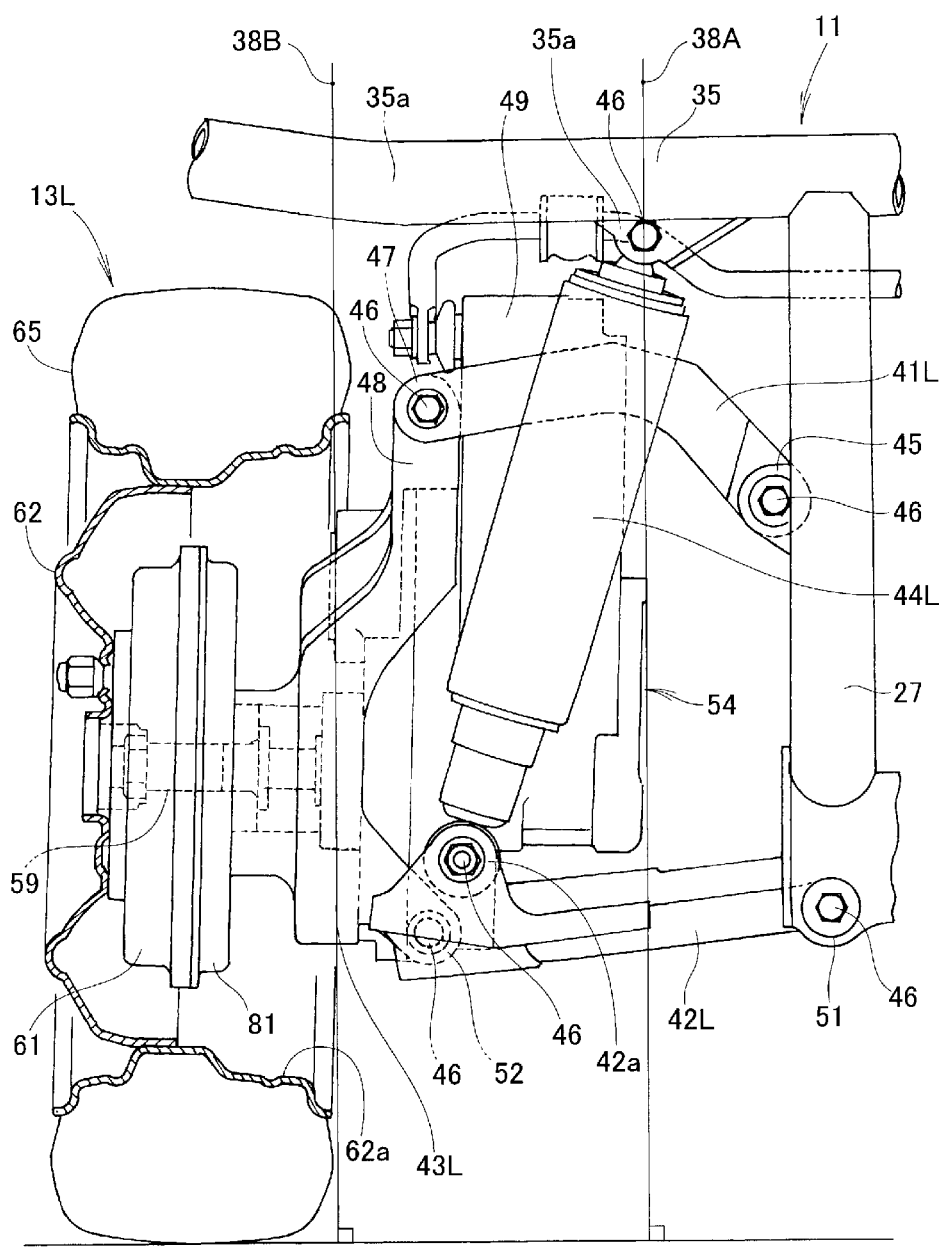
FIG. 3 is an enlarged view of a main portion of FIG. 2.

As shown in FIG. 3, the upper arm 41L is connected to the vehicle body frame 11 (specifically, the rear portion subframe 27) at a vehicle body frame side connection portion 45 with a connector 46. A bolt formed by providing a bolt head and a female screw on a pin extending in a near-far direction of the drawing is preferable as the connector 46.

The distal end of the upper arm 41L is connected to an upper arm portion 48 of the knuckle 43L at a joint portion 47 with the connector 46.

The upper arm 41L is a V-shaped member having an intermediate portion (center portion in the vehicle width direction) protruding upward. The vehicle body frame side connection portion 45 is below the joint portion 47.

A motor case 49 is disposed on the far side (vehicle front side) of the upper arm 41L in the drawing. Forming the upper arm 41L in a so-called "inverted-V shape" allows the upper arm 41L to avoid the motor case 49.

The lower arm 42L is also connected to a lower portion of the vehicle body frame 11 (specifically, the rear portion subframe 27) at a lower vehicle body frame side connection portion 51 with the connector 46 and is connected to a lower portion of the knuckle 43L at a lower joint portion 52 with the connector 46.

The rear cushion 44L is disposed in an oblique vertical direction. An upper portion of the rear cushion 44L is connected to the vehicle body frame 11 (specifically, an upper cushion connection portion 35a provided in the rear subframe 35) with the connector 46 while the lower portion thereof is connected to the lower arm 42L at a lower cushion connection portion 42a with the connector 46.

Assume that an inner perpendicular line 38A passing through a point of a drive unit 54 which is closest to the center in the vehicle width direction is drawn and an outer perpendicular line 38B passing through an outermost point of the drive unit 54 in the vehicle width direction is drawn. The upper cushion connection portion 35a and the lower cushion connection portion 42a are each disposed between the inner perpendicular line 38A and the outer perpendicular line 38B or on any one of the inner perpendicular line 38A and the outer perpendicular line 38B.

The rear wheel 13L and a drive unit 54 are attached to the knuckle 43L in such a way that the knuckle 43L is interposed between the rear wheel 13L and the drive unit 54 (details will be described in FIG. 4). The drive unit 54 serves the role of driving the rear wheel 13L.

The drive unit 54 and the rear cushion 44L overlapping each other in a rear view (likewise also in a vehicle front view) is one of structural characteristics. Since the rear cushion 44L is disposed to overlap the drive unit 54 in the present invention, the dimension in the vehicle width direction can be made smaller than that in the case where the cushion 44L is disposed on the vehicle width center side of the drive unit 54.

Figure 4:
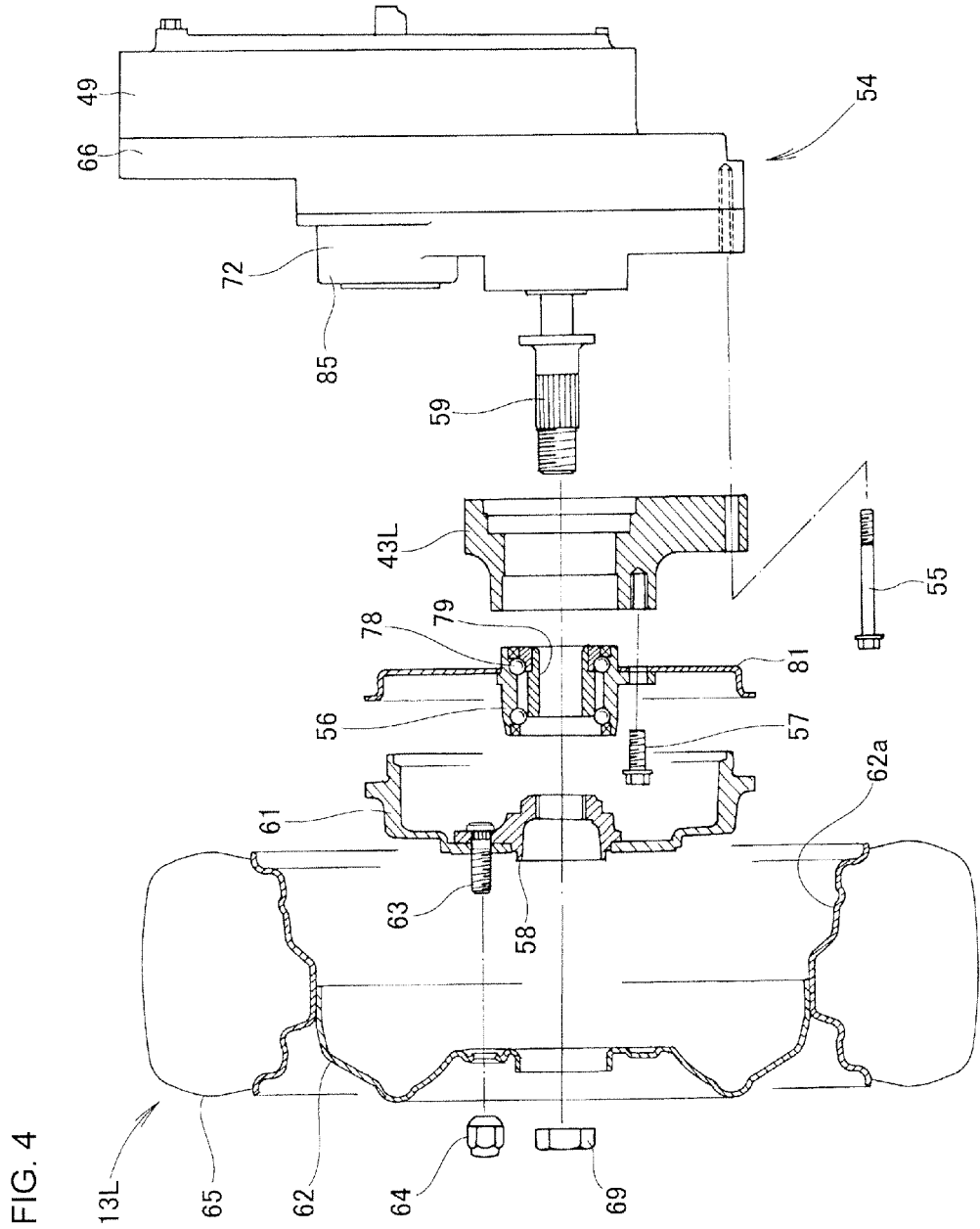
FIG. 4 is an exploded view around a rear wheel.

As shown in FIG. 4, the drive unit 54 is fixed to a surface of the knuckle 43L on the vehicle body center side with a bolt 55. Moreover, a bearing case 56 is fixed to a surface of the knuckle 43L on a vehicle outer side (side close to the wheel 62) with a bolt 57. A wheel supporting member 58 is disposed on the vehicle outer side of the bearing case 56. The wheel supporting member 58 is spline-coupled to an output shaft 59 extending from the drive unit 54 and is rotated by the output shaft 59.

A brake drum 61 and a wheel 62 of the rear wheel 13L are fastened together to the wheel supporting member 58 with a bolt 63 and a nut 64. The rear wheel 13L and the drive unit 54 are thus attached to the knuckle 43L.

Figure 5:
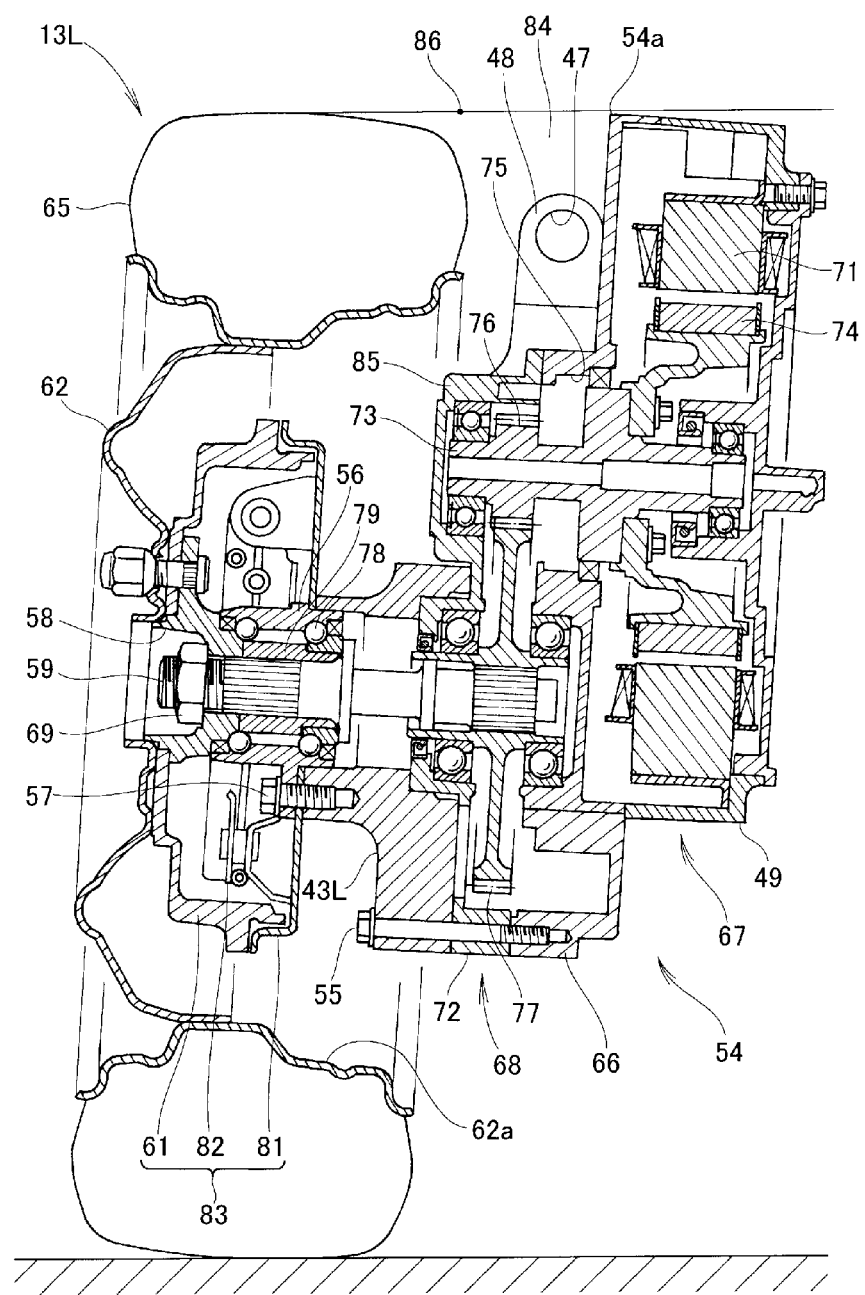
FIG. 5 is a cross-sectional view of the rear wheel and a drive unit.

A form after the attachment is described in detail by using FIG. 5.

As shown in FIG. 5, the rear wheel 13L includes the wheel 62 which has a bowl-shaped recessed portion 62a and a tire 65 which is mounted on the wheel 62.

Moreover, the drive unit 54 is formed by attaching an electric motor 67 on one surface of a center case 66 and by attaching a reducer 68 on the other surface of the center case 66.

The electric motor 67 includes the bottomed-tube-shaped motor case 49 fastened to the center case 66, a stator 71 attached to the motor case 49, a motor shaft 73 rotatably supported at one end by the motor case 49 and rotatably supported at the other end by a reducer case 72, and a rotor 74 attached to the motor shaft 73 and surrounded by the stator 71.

The center case 66 is a vertically-long member and has a through hole 75 through which the motor shaft 73 penetrates.

The reducer 68 includes the bottomed-tube-shaped reducer case 72 fastened to the center case 66, a small-diameter drive gear 76 provided at a front end of the motor shaft 73 and housed in the reducer case 72, a large-diameter driven gear 77 rotated by the drive gear 76 directly or via an intermediate gear and housed in the reducer case 72, and the output shaft 59 rotated by the driven gear 77 and rotating the wheel 62.

An inner race 79 is provided inside the bearing case 56 with rolling elements 78 therebetween and the output shaft 59 is spline-coupled to the inner race 79. Specifically, a front end of the output shaft 59 is rotatably supported by the bearing case 56 and displacement (deflection) in a radial direction is thereby prevented.

Moreover, the wheel supporting member 58 is fixed to the front end of the output shaft 59 with a nut 69. The wheel 62 is thereby rotated by the output shaft 59. An upward load acting on the rear wheel 13L is transmitted to the wheel supporting member 58, the output shaft 59, and the inner race 79 in this order. Since the wheel supporting member 58 and the inner race 79 are in contact with each other in an axial direction and a protruding length of the output shaft 59 from the inner race 79 is short, the upward load acting on the rear wheel 13L is supported by the inner race 79 and is then supported by the knuckle 43L via the bearing case 56.

Since almost no bending moment acts on the output shaft 59, the output shaft 59 can be designed exclusively for rotary power transmission. Accordingly, the diameter of the output shaft 59 can be reduced.

A brake base plate 81 is fixed to an outer periphery of the bearing case 56. Brake shoes and a shoe expanding part 82 are attached to the brake base plate 81.

Moreover, the brake drum 61 is fixed to the wheel supporting member 58. Braking of the rear wheel 13L can be performed by causing the brake shoes to slide in contact with an inner peripheral surface of the brake drum 61.

A brake device 83 including the brake drum 61, the brake base plate 81, the brake shoes, and the shoe expanding part 82 which are described above is provided in the recessed portion 62a of the wheel 62.

Moreover, in a rear view (likewise in a vehicle front view), there is formed a rectangular space 84 surrounded from three sides by the tire 65, the reducer case 72, and the center case 66. The joint portion 47 for connecting the upper arm portion 48 and the upper arm 41L to each other is disposed in the rectangular space 84.

Since the joint portion 47 is disposed in the rectangular space 84, connection work and separation work of the joint portion 47 can be performed easily by using the rectangular space 84 as a work space. Accordingly, the work time can be reduced.

Moreover, a bearing supporting portion 85 supporting the other end of the motor shaft 73 is provided in the reducer case 72. The bearing supporting portion 85 protrudes to the recessed portion 62a while extending at a lateral side of the knuckle 43L.

In other words, the reducer case 72 being part of the drive unit 54 is partially housed in the recessed portion 62a of the wheel 62. The drive unit 54 can be located closer to the rear wheel (drive wheel) 13L by an amount corresponding to the housed portion. Accordingly, it is possible to dispose part of the drive unit 54 inside the wheel 62 and thereby suppress protruding of the drive unit 54 to a small degree.

As described in FIG. 2, the rear wheels 13L, 13R are each inclined in such a way that the upper end thereof is located closer to the vehicle width center. Accordingly, as shown in FIG. 5, an uppermost point 54a of the drive unit 54 is below a horizontal line 86 passing through an upper end of the tire 65.

Figure 6:
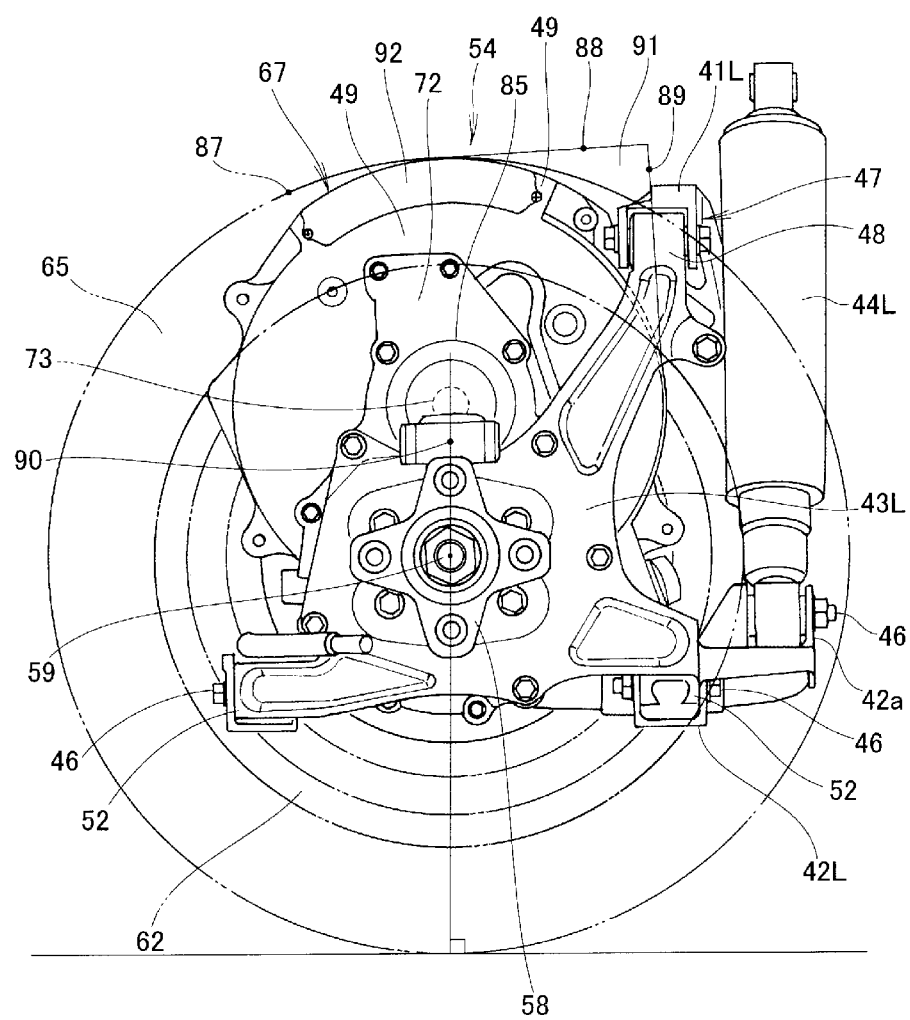
FIG. 6 is a left side view of a suspension device.

As shown in FIG. 6, the drive unit 54 is thus disposed inside an outer diameter circle 87 of the tire 65 which is shown by an imaginary line. Since the drive unit 54 cannot be seen in a vehicle side view, appearance is improved. Moreover, since the tire 65 serves as a protection material of the drive unit 54, a protection cover of the drive unit 54 can be omitted.

Furthermore, as shown in FIG. 6, the upper arm portion 48, lower joint portions 52, 52 connecting the lower arm 42L to the knuckle 43L, and the cushion connection portion 42a connecting the cushion 44L to the lower arm 42L are disposed inside the outer diameter circle 87 of the tire 65 in the vehicle side view.

The upper arm portion 48, the lower joint portions 52, 52, and the cushion connection portion 42a are protected by the tire 65.

Furthermore, as shown in FIG. 6, the electric motor 67 is disposed in such a way that a perpendicular line 90 passing through the rotation center of the wheel 62 (center of the output shaft 59) and extending upward overlaps the motor shaft 73.

The upper arm portion 48 is extended obliquely upward toward the rear of the vehicle from the knuckle 43L to a position where the upper arm portion 48 does not overlap the drive unit 54, and the upper arm 41L is connected to the upper end of the upper arm portion 48. Modifying the arrangement of the upper arm portion 48 eliminates the interference of the drive unit 54 with the upper arm 41L. As a result, the electric motor 67 can be disposed in a form extending upward. Even when the electric motor 67 is too large to be disposed in the recessed portion 62a of the wheel 62, the electric motor 67 can be easily disposed behind the rear wheel 13L while avoiding interference with the upper arm portion 48 and the upper arm 41.

Moreover, as shown in FIG. 6, in the vehicle side view, an upper half of the motor case 49 has a semicircle shape, and at least part of the joint portion 47 is disposed in an almost-triangular space 91 surrounded by the semicircle (motor case 49), a horizontal line 88 passing through the uppermost point of the semicircle (motor case 49), and a vertical line 89 passing through the vehicle rearmost point of the semicircle (motor case 49).

By disposing the joint portion 47 in the almost-triangular space 91 formed in a corner above the semicircle shape, the joint portion 47 can be disposed close to the motor case 49 while avoiding interference with the motor case 49.

In the present embodiments, although the rear wheels are the drive wheels, in some embodiments the front wheels may be the drive wheels.

The present invention is preferably applied to a narrow four-wheel vehicle in which a driver seat and a passenger seat are arranged one behind the other.

EXPLANATION OF THE REFERENCE NUMERALS

10 ELECTRIC VEHICLE
11 VEHICLE BODY FRAME
13L, 13R DRIVE WHEEL (REAR WHEEL)
41L, 41R UPPER ARM
42L, 42R LOWER ARM
43L, 43R KNUCKLE
44L, 44R CUSHION (REAR CUSHION)
45 VEHICLE BODY FRAME SIDE CONNECTION PORTION
47 JOINT PORTION
48 UPPER ARM PORTION
49 MOTOR CASE
52 LOWER JOINT PORTION
54 DRIVE UNIT
59 OUTPUT SHAFT
62 WHEEL
62a RECESSED PORTION OF WHEEL
65 TIRE
66 CENTER CASE
67 ELECTRIC MOTOR
68 REDUCER
72 REDUCER CASE
73 MOTOR SHAFT
83 BRAKE DEVICE
85 BEARING SUPPORTING PORTION
87 OUTER DIAMETER CIRCLE
88 HORIZONTAL LINE
89 VERTICAL LINE
90 PERPENDICULAR LINE
91 ALMOST-TRIANGULAR SPACE

The invention claimed is:

1. An electric vehicle, comprising:
left and right drive wheels;
a brake device provided in a recessed portion of a wheel of each of the drive wheels, wherein the wheel of each of the drive wheels is driven by a drive unit;
a vertically-swingable upper arm and a vertically-swingable lower arm extending from a vehicle body frame of the electric vehicle in a vehicle width direction;
a knuckle connected to a distal end of the upper arm and a distal end of the lower arm, wherein the wheel is rotatably supported by the knuckle, the drive unit is connected to the knuckle from a vehicle body center side, and
a cushion disposed between the vehicle body frame and the lower arm,
wherein the drive unit comprises a unit in which an electric motor and a reducer are integrated, said vehicle further comprising
an upper arm portion extending obliquely upward toward a rear of the vehicle from the knuckle, and interposed between the wheel and the drive unit to a position where the upper arm portion does not overlap the drive unit in a vehicle side view, wherein the upper arm is connected to an upper end of the upper arm portion, and the cushion is disposed on a vehicle rear side of the upper arm, wherein the cushion is disposed to overlap the drive unit in a vehicle front view.

2. The electric vehicle according to claim 1, wherein a line is extended upward from a rotation center of the wheel in the vehicle side view and the electric motor is disposed in such a way that a motor shaft of the electric motor overlaps the line.

3. The electric vehicle according to claim 2, wherein
the drive unit is formed by attaching the electric motor to one surface of a center case and by attaching the reducer to another surface of the center case, and
in the vehicle side view, an upper half of a motor case has a semicircle shape and at least part of a joint portion is disposed in an almost-triangular space surrounded by the semicircle, a horizontal line passing through the uppermost point of the semicircle, and a vertical line passing through the vehicle rearmost point of the semicircle.

4. The electric vehicle according to claim 3, wherein,
in the vehicle front view, the reducer is disposed on a side closer to the wheel, the electric motor is disposed on a vehicle width center side, the motor shaft is rotatably supported at one end by the motor case, and is rotatably supported at another end by a reducer case, and
a bearing supporting portion supporting the other end of the motor shaft is provided in the reducer case and protrudes to the recessed portion of the wheel while extending at a lateral side of the knuckle.

5. The electric vehicle according to claim 1, wherein the drive unit is disposed inside an outer diameter circle of a tire of each of the drive wheels in the vehicle side view.

6. The electric vehicle according to claim 1, wherein the upper arm portion, a lower joint portion connecting the lower arm to the knuckle, and a cushion connection portion connecting the cushion to the lower arm are disposed inside an outer diameter circle of a tire in the vehicle side view.

7. The electric vehicle according to claim 3, wherein the upper arm comprising a V-shaped member having an intermediate portion protruding upward and a vehicle body frame side connection portion of the upper arm is below the joint portion.

8. An electric vehicle, comprising:
left and right drive wheel means for driving the electric vehicle;
brake means for braking, said brake means being provided in a recesses portion of a wheel of each of the drive wheel means, wherein the wheel of each of the drive wheel means is driven by a drive means, said drive means for providing rotational power;
upper arm means and lower arm means for transmitting vertically swingable motion, said upper arm means and lower arm means extending from a vehicle body frame of the electric vehicle in a vehicle width direction;
knuckle means for rotatably supporting the wheel, wherein the drive means is connected to the knuckle means from a vehicle body center size;
cushion means disposed between the vehicle body frame and the lower arm means, wherein the drive means comprises a unit in which an electric motor and a reducer are integrated, said vehicle further comprising
an upper arm portion extending obliquely upward toward a rear of the vehicle from the knuckle means, and interposed between the wheel and the drive means to a position where the upper arm portion does not overlap the drive means in a vehicle side view, wherein the upper arm means is connected to an upper end of the upper arm portion, and the cushion means is disposed on a vehicle rear side of the upper arm means, wherein the cushion means is disposed to overlap the drive means in a vehicle front view.

9. The electric vehicle according to claim 8, wherein a line is extended upward from a rotation center of the wheel in the vehicle side view and the electric motor is disposed in such a way that a motor shaft of the electric motor overlaps the line.

10. The electric vehicle according to claim 9, wherein the drive means is formed by attaching the electric motor to one surface of a center case and by attaching the reducer to another surface of the center case, and
in the vehicle side view, an upper half of a motor case has a semicircle shape and at least part of a joint portion is disposed in an almost-triangular space surrounded by the semicircle, a horizontal line passing through the uppermost point of the semicircle, and a vertical line passing through the vehicle rearmost point of the semicircle.

11. The electric vehicle according to claim 10, wherein, in the vehicle front view, the reducer is disposed on a side closer to the wheel, the electric motor is disposed on a vehicle width center side, the motor shaft is rotatably supported at one end by the motor case and is rotatably supported at another end by a reducer case, the electric vehicle further comprising
bearing supporting means for supporting the other end of the motor shaft, said bearing supporting means being disposed in the reducer case and protruding to the recessed portion of the wheel while extending at a lateral side of the knuckle means.

12. The electric vehicle according to claim 8, wherein the drive means is disposed inside an outer diameter circle of a tire of each of the drive wheel means in the vehicle side view.

13. The electric vehicle according to claim 8, wherein the upper arm portion, a lower joint portion connecting the lower arm means to the knuckle means, and a cushion connection portion connecting the cushion means to the lower arm means are disposed inside an outer diameter circle of a tire in the vehicle side view.

14. The electric vehicle according to claim 10, wherein the upper arm means comprises V-shaped member means having an intermediate portion protruding upward and a vehicle body frame side connection portion of the upper arm means is below the joint portion.

* * * * *